United States Patent [19]
Britton et al.

[11] Patent Number: 5,258,982
[45] Date of Patent: Nov. 2, 1993

[54] METHOD OF EXCLUDING INACTIVE NODES FROM TWO-PHASE COMMIT OPERATIONS IN A DISTRIBUTED TRANSACTION PROCESSING SYSTEM

[75] Inventors: Kathryn H. Britton, Chapel Hill; Andrew P. Citron, Raleigh, both of N.C.; Chandrasekaran Mohan, San Jose, Calif.; George M. Samaras, Raleigh, N.C.

[73] Assignee: International Business Machines Corporation, Armonk, N.Y.

[21] Appl. No.: 696,667

[22] Filed: May 7, 1991

[51] Int. Cl.⁵ .............................................. H04J 3/12
[52] U.S. Cl. ................................. 370/110.1; 370/94.3; 370/37; 340/825.02; 340/826
[58] Field of Search ...................... 370/94.3, 31, 110.1; 340/825.02, 826

[56] References Cited

U.S. PATENT DOCUMENTS 4,769,772  9/1988  Dwyer ............................... 395/275

OTHER PUBLICATIONS

Transaction Management in the R* Distributed Database Management System, by C. Mohan, B. Lindsay, and R. Obermarck.

ISO/IEC JTC 1/SC 21 N2608 Information Processing Systems-Part 1.
ISO/IEC JTC 1/SC 21 N2607 Information Processing Systems-Part 2.
ISO/IEC JTS 1/SC 21 N2608 Information Processing Systems-Part 3.

Primary Examiner—Douglas W. Olms
Assistant Examiner—Russell W. Blum
Attorney, Agent, or Firm—Jerry W. Herndon

[57] ABSTRACT

A method of reducing the number of messages required for sync point (commit or backout) operations by leaving out nodes that have not participated in the corresponding transaction. A two-phase sync point protocol is used in a distributed transaction processing network to commit or backout transactions in the network. In response to the beginning of sync point operations on a transaction x, each node determines if each of its partner nodes stated on the sync point operation for transaction $x-1$ that the partner could be left out of sync point operations for transaction $x-1$. If a partner node did so state that it could be left out, the present node determines if the partner node was included by the present node during the present transaction x. If the partner node was not included during the present transaction, the present node excludes the partner node from the present sync point operations.

23 Claims, 11 Drawing Sheets

METHOD OF EXCLUDING INACTIVE NODES FROM TWO-PHASE COMMIT OPERATIONS IN A DISTRIBUTED TRANSACTION PROCESSING SYSTEM

TECHNICAL FIELD

The invention is related to database and transaction processing systems generally and to distributed systems which use two-phase commit and backout protocols to insure that database consistency is maintained. In particular, the invention relates to determining certain nodes in a distributed system that may be excluded from commit and backout operations as a technique for reducing the number of messages that must be propagated throughout the system and reducing the time that resources are locked to other operations.

BACKGROUND OF THE INVENTION

Prior art two-phase commit protocol messages control operations between nodes in distributed transaction systems. These protocols are designed to insure that database consistency is maintained even in the face of failures, that is, to insure that transactions either commit or are backed out in all nodes. To accomplish this, prior systems pass messages to all nodes of a transaction system on every transaction. This is done irrespective of the activity that occurs at any given node on any given transaction. A result of this is that many messages are passed between nodes on every transaction to insure compliance with the protocols. This, in turn, consumes network time and resources and reduces the total transaction capacity that the network is able to handle. Thus, it would be desirable if certain nodes in a system could be "left out" of sync point (commit or backout) operations when appropriate to reduce the network traffic and thereby also to reduce the time that resources are in locked states.

One proposal for OSI (Open systems Interconnect) transaction processing standards allow a node to be left out by unilaterally informing a node at the beginning of one sync point operation (commit or backout) that it will be left out of the next operation. When this occurs, the node that is to be left out must not begin any independent work, such as a different transaction. While this approach aids in the reduction of network messages, it has certain disadvantages. First, the initiator of the commit or back out operation (the parent of the node to be left out) imposes unilateral restraints on the partner node without consulting the partner node. However, the partner node may need to initiate independent action and should therefore continue to be included in synchronization operations. This might occur, for example, in a peer-to-peer network, as contrasted to a client-server network. Since the decision to leave out is conclusively made at the beginning of one synchronization operation affecting the next synchronization operation and without asking for the opinion of the child. Therefore the decision to leave a partner out cannot be based on data processed during the next transaction. This requirement severely limits the number of instances where it is practical to leave a partner out. It would be desirable to allow both nodes some flexibility in reaching the final leave out decision.

To alleviate the above problems, other OSI proposals allow a left out node or subtree to start independent work by generating its own unique unit-of-work (transaction) identifier, which it propagates to it children nodes in the left out subtree of the system. If the parent decides to include the child that has started an independent transaction, both transactions are backed out, causing excessive work to be lost. Obviously, this is not a very desirable solution.

The OSI standards referred to above are described in:
ISO/IEC JTC 1/SC 21 N2608 Information Processing Systems—Open Systems Interconnect—Distributed Transaction Processing Part 1;
Transaction Processing Model ISO/IEC JTC 1/SC 21 N2607 Information Processing Systems—Open Systems Interconnect—Distributed Transaction Processing Part 2: Service Definition;
ISO/IEC JTC 1/SC 21 N2608 Information Processing Systems—Open Systems Interconnect—Distributed Transaction Processing Part 3: Transaction Processing Protocol Specification Another set of protocols for controlling distributed database operations are the R* protocols. The R* protocols are described in "The R* Distributed Database Management System", 1986, ACM 03625915/86/1200-0378. The R* protocols assume that an agent node is always eligible to be left out of the next transaction and will never proceed with independent work unless it receives permission to do so. Like the OSI approach, this solution assumes a client-server relationship, which imposes the will of the parent node on the child node, which is undesirable and inappropriate in some cases such as for a peer-to-peer network.

SUMMARY OF THE INVENTION

The invention is a method of reducing the number of messages required for sync point (commit or backout) operations by leaving out nodes that have not participated in corresponding transaction. A two-phase sync point protocol is used in a distributed transaction processing network to commit or backout transactions in the network. In response to the beginning of sync point operations on a transaction x, each node determines if each of its partner nodes stated on the sync point operation for transaction $x-1$ that the partner could be left out of sync point operations for transaction $x-1$. If a partner node did so state that it could be left out, the present node determines if the partner node was included by the present node during the present transaction x. If the partner node was not included during the present transaction, the present node excludes the partner node from the present sync point operations.

In a preferred embodiment, during transaction x, if a node knows that it will do nothing on the next transaction $x+1$, unless it is asked to perform work by another node, then it will inform its parent node at commit time on the present transaction x that it may be "left out" of the next commit operation, if desired. This indication means that the child will not independently start work during transaction $x+1$ without receiving a message from the parent. Therefore, the parent knows whether the child has done any work simply by checking to see if any message has been sent to the child during this transaction. If the node is "left out", no sync point messages are passed to the node (nor, as a result, to its children nodes) on sync point operation $x+1$, and on all subsequent sync point operations until a node wishes to include it.

A child node indicates to its parent that it may be left out of the next sync point operation only if all the following are true:

1) The child node's transaction program has indicated its willingness to be inactive until the sync point initiator (the parent) of the child node chooses to include it again;
2) All nodes subordinate to the child node (for which it acts as sync point initiator) have indicated that they may also be left out;
3) The connection to the parent, if half-duplex, is left in a send state that allows the parent to send the next message.

The result of the invention is that a node that is left out of sync point operations is inactive until it receives an indication of the next unit of work in which it will participate. Additionally, all nodes subordinate to the left out node are similarly inactive for at least the same amount of time. When a child node is again included in a transaction, this node may or may not choose to include its subordinate nodes, all in accordance with the invention.

DETAILED DESCRIPTION

A logical unit of work (LUW) in a database system is a sequence of actions performed to take a set of resources, typically database records, from one consistent state to another in such a way that the LUW appears to be atomic. If a failure occurs during a LUW, the changes made as part of the LUW are backed out, so that the resources return to the consistent state that existed at the start of the LUW. Otherwise, the changes are committed at all relevant nodes of the system.

Two-phase commit protocols are used to insure atomic consistency, even in the face of failures. The basic protocols are described in J. N. Gray's "Notes on Database Operating Systems," published in Operating Systems - An Advanced Course; Lecture Notes in Computer Science; Volume 60, Springer-Verlag, 1978. Some variations of these protocols for use in the System Network Architecture (SNA) are described in IBM's LU 6.2 Reference: Peer Protocols (SC31-6808). Other variations are described in aforementioned OSI and R* protocol references.

Figure 1:
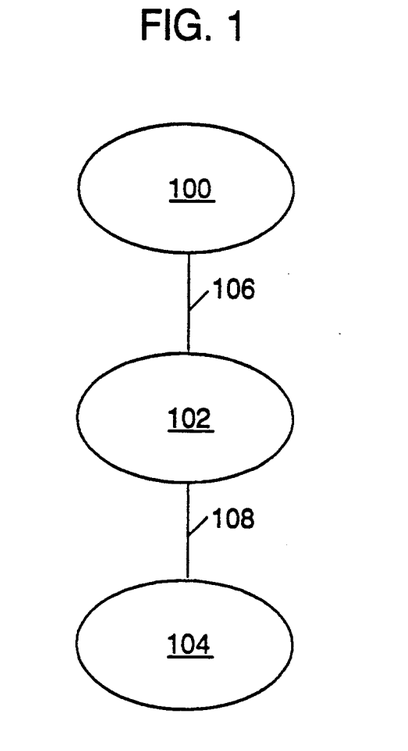
FIG. 1 shows a simple distributed network consisting of three nodes serially connected by communication links.

For completeness, the basic two-phase commit protocols will be briefly described with reference to FIG. 1. Reference is made to the above publications for a complete description. FIG. 1 shows a simple distributed database transaction tree consisting of nodes 100, 102 and 104. Nodes 100 and 102 are connected by a conversation 106. Nodes 102 and 104 are connected by a conversation 108. This tree is referred to as an allocation tree. The allocation tree refers to the fixed relationship among transaction programs (TPs) in the nodes that is established when the conversations are created. In contrast a sync point tree can change for each transaction depending on the node that initiates a sync point operation. For example, if node 102 starts a commit operation for the present transaction, it becomes the root of the sync point tree, with its child nodes being 100 and 104.

Now, assuming that node 102 initiates a commit operation, this means that the TP of node 102 issued a command to start a two-phase commit operation. At this point node 102 sends a PREPARE TO COMMIT message to both nodes 100 and 104, thereby becoming the commit initiator. Nodes 100 and 104 decide individually if operations have proceeded satisfactorily from their point of view and each return a vote in the form of an 'agree' or 'not agree' message. In the normal case, both nodes 100 and 104 return an 'agree' message to node 102. After receiving the 'agree' message from both nodes 100 and 104, node 102 sends a 'commit' message to nodes 100 and 104 and the data modifications performed at each of the nodes are then made permanent. If either of nodes 100 or 104 return a 'not agree' message to the 'prepare to commit', node 102 sends a 'backout' message to each of nodes 100 and 104 and each node then returns its data to the consistent state that existed at the beginning of the present transaction. This simple example has many variations depending on the specific two-phase commit protocol that is used by a system. The invention is easily incorporated into these variations.

Figure 2:
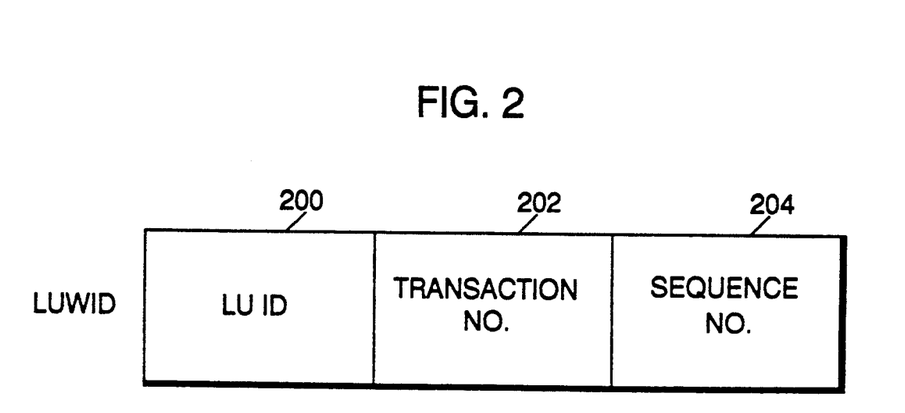
FIG. 2 shows one illustrative format of a logical-unit-of-work identifier (LUWID), which is a unique identification of a transaction, i.e., a logical unit of work subject to single sync point operation.

The invention is described in terms of IBM's SNA logical unit (LU) 6.2 architecture, although it will be apparent that the invention is not limited to this environment. In LU 6.2, at the end of each sync point operation, each node automatically increments its logical unit of work identifier (LUWID) and proceeds automatically to new work, if new work is present. The LUWID is unique for each transaction in the network. To insure uniqueness, the beginning value of the LUWID is assigned when the network is created by the root of the he physical tree, node 100 in FIG. 2. As shown in FIG. 2, the LU 6.2 logical-unit-of-work identifier (LUWID) consists of three components: the identity of the LU that initially generates the LUWID (field 200), a transaction instance number (field 202), which is unique at the generating LU, and a sequence number (field 204) which illustratively starts at 1 and is incremented automatically by 1 at each LU participating in a transaction following each commit or backout. This is called chained operation and is not present in networks in which nodes explicitly wait for the beginning of new transactions and associated transaction numbers.

Figure 3:
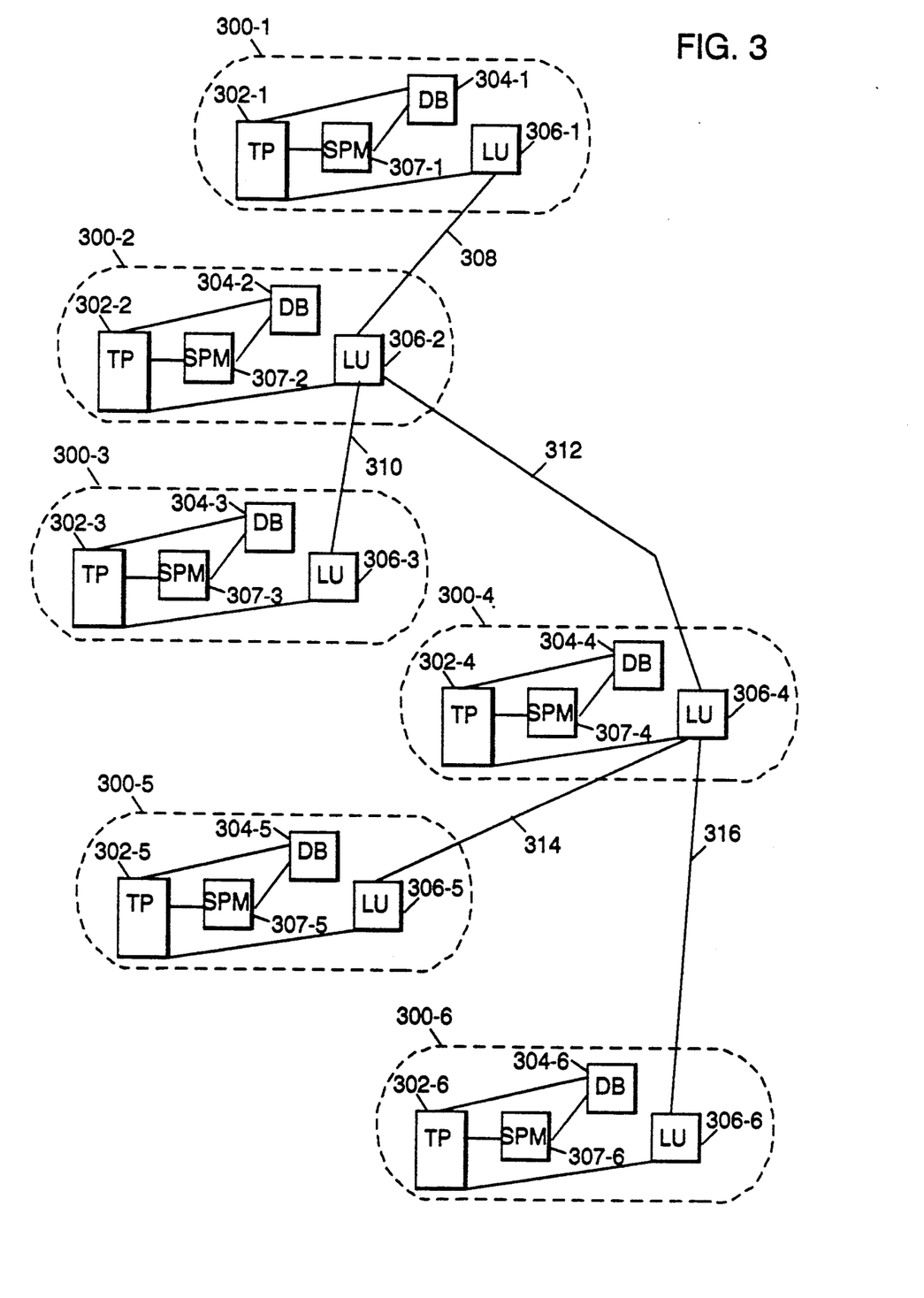
FIG. 3 shows a more complicated distributed network in which each node includes a Sync-Point-Manager (SPM), a transaction program (TP), a database resource and a logical unit (LU) which is used to allow a TP to communicate with another TP in the same or a different node.

FIG. 3 shows one illustrative physical transaction tree consisting of nodes 300-1 through 300-6. Each node contains a SPM 307, at least one transaction program (TP) 302, a resource such as database 304 and a logical unit (LU) 306 by means of which a TP can communicate with other TPs. While FIG. 3 shows one TP at each node, it should be understood that in the general case, a node may contain multiple TPs all interacting with themselves and other nodes via LUs to effect resource transactions. Resources may be viewed as including virtually anything available at a node for use by a TP, such as local files and devices. However, for the purposes of this disclosure, such resources will be considered to be databases for simplicity.

SPMs and LUs in conjunction execute verbs that allow local TPs to participate in distributed transactions. Some verbs allow one TP to send or receive data to or from another TP. The SPM executes sync point verbs to commit or backout a transaction at all nodes on request of a TP. Reference is made to IBM publication TRANSACTION PROGRAMMER'S REFERENCE MANUAL FOR LU 6.2, GC30-3084 for a detailed description of the LU 6.2 verbs. Reference is made to IBM publication SC30-3269, FORMAT AND PROTOCOL REFERENCE MANUAL for a detailed description of the LU 306. Both of these publications are incorporated by reference herein.

In accordance with the invention, FIGS. 4 through 12 show the method steps that are carried out at the SPM of each node in order that appropriate nodes may be left out of subsequent sync point operations. The following terminology is used in the explanation of the invention. The sync point initiator refers to the particular mode of a tree that decides when to attempt a commit operation of a transaction (a logical-unit-of-work LUW) at all of the other relevant nodes. The sync point tree refers to the logical tree that results from the physical tree, such as shown in FIGS. 1 or 3, when the sync point initiator node is viewed as the root of the commit tree. For purposes of understanding the disclosure, especially with respect to the rules for leaving nodes out of sync point operations, it is helpful to emphasize that the sync point initiator node may change with each transaction. The reader should visualize the sync point tree by picking up the physical network by the sync point initiator node, so that children and subtrees become evident from the perspective of the sync point initiator node. This concept of the changing sync point tree is important for an understanding of the invention, because, as will be seen, it determines the logical subtrees that will be left out by parent nodes in subsequent sync point operations, even though the sync point tree existing at the time the subtree was determined to be left out no longer exists. From the perspective of a given node, a parent node is a node that is adjacent to and higher in a commit tree than the given node; a child node is lower and adjacent to the give node in the commit tree and a partner node is a parent or child node. Thus, in FIG. 3, if node 300-6 begins a commit operation, then it is the sync point initiator and the root node of the sync point tree. It is also the parent of node 300-4, which is its child node. As will be seen, if during this sync point operation, node 300-2 indicates that it can be left out of subsequent sync point operations (speaking for itself and its child nodes 300-1 and 300-3), then the subtree formed by nodes 300-2, 1 and 3 will continue to be left out of subsequent sync point operations until some event removes the left out status. As an aside at this early point, only node 300-4 (the parent of 300-2 at the time of the commit operation that resulted in the subtree being subsequently left out) knows of and administers the left out status of the subtree.

Each SPM of each node maintains a number of illustrative variables that enable it to perform the appropriate steps to be described. These illustrative variables are:

OK-LO-PARTNER—One logical variable per partner. The variable is TRUE if the partner can be left out of the next sync point (commit or backout) operation by this node. For example, in FIG. 3, nodes 300-4 has OK-LO-PARTNER variables for nodes 300-2, 300-5 and 300-6. The state of this variable can only be changed during sync point operations that successfully commit.

OK-LO—This is a flag in 'agree' and 'commit' messages that flow between the nodes. When TRUE, the flag indicates to the receiver that the subtree formed by the sender and its descendants can be left out of subsequent sync point operations. The value of this flag in any given message is determined by a number of factors that are described in detail in the discussion below.

PROPOSED-OK-LO-PARTNER—One logical variable per partner. The variable is TRUE if the partner has indicated in an 'agree' message that it can be left out of subsequent sync point operations. The value of this variable is moved to OK-LO-PARTNER only if the sync point operation commits, rather than backs out.

SUBTREE-OK-LO—A summary bit maintained in each node. It is TRUE only if all conditions at a node have been met for setting OK-LO in an 'agree' message to a parent.

LUWID-SOURCE—One variable per node. This variable contains either "null" or the identity of a partner node which can leave out this node in subsequent sync point operations.

PROPOSED-LUWID-SOURCE—One variable per node. This is a proposed value of LUWID-SOURCE. Its value is moved into LUWID-SOURCE if the present sync point operation commits, rather than backs out.

Figure 4:
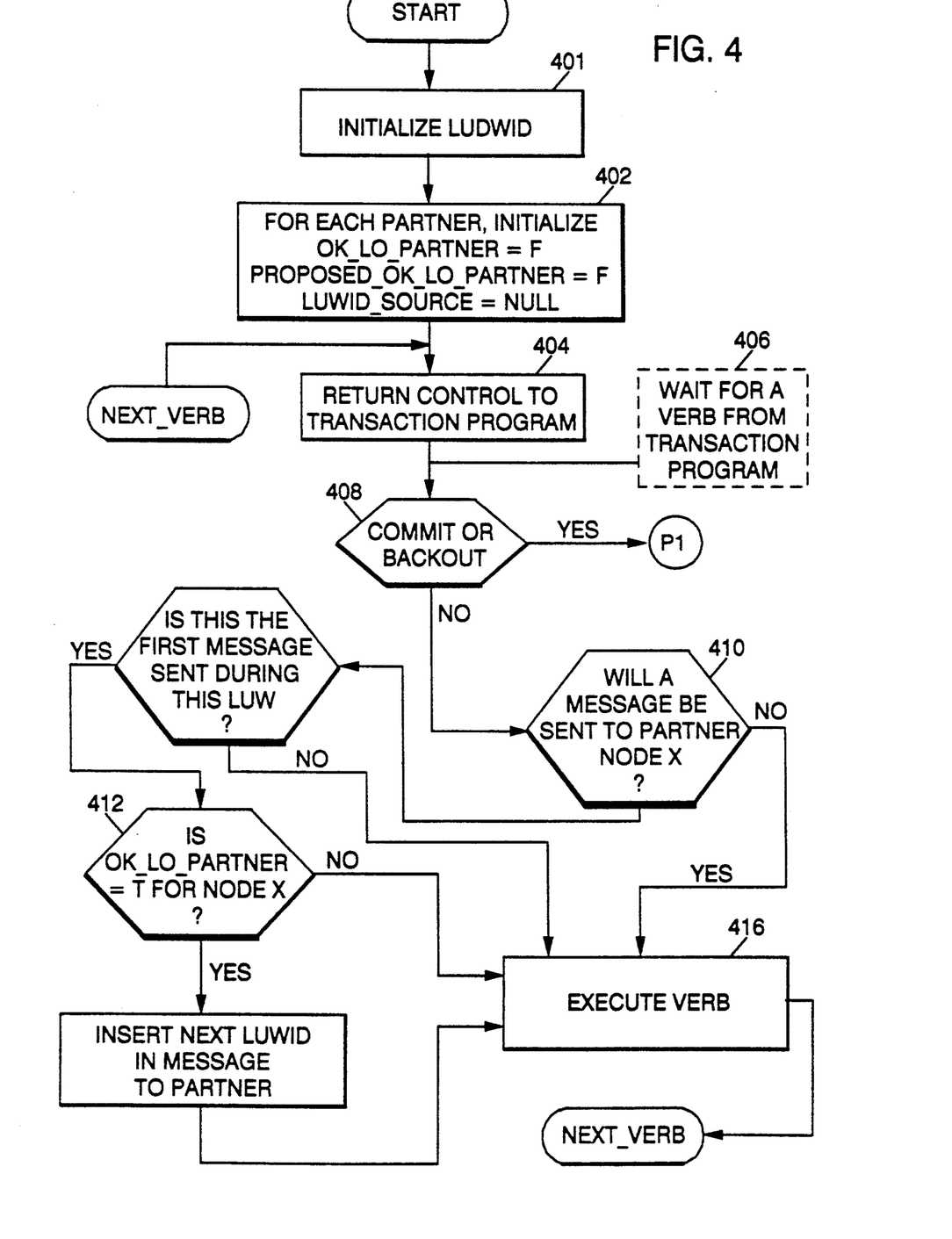
FIGS. 4 through 12 show illustrative steps for completing sync point operations in a network and for leaving out nodes in the sync point operations when it is appropriate to do so.

With reference to FIG. 4, START is executed in the sync point manager (SPM) of each node in response to creation of the physical tree by a transaction program TP in the root node of the physical tree (node 300-1 of FIG. 3) or by an ATTACH message from another node during creation of the physical tree. Step 401 initializes the logical u nit of work identification to the LUWID included in the ATTACH message, or it creates a unique LUWID if this is the root node. Step 402 initializes each of the variables OK-LO-PARTNER and PROPOSED-OK-LO-PARTNE to the default state FALSE and sets LUWID-SOURCE to 'null'. Step 402 returns control to the transaction program that initiated operations in the root node or to a transaction program identified in the ATTACH message in intermediate nodes. The SPM in each node then waits for verb commands from the associated transaction program.

Receipt by the SPM of a verb issued by a TP is illustrated at step 406. When this occurs, step 408 determines if the verb is for a sync point operation (COMMIT or BACKOUT). Assume for the time being that this is the first verb to be issued by the TP. It will usually be an ordinary verb, e.g., a send or receive verb, as opposed to a sync point operation. In this case, the function of the SPM is to execute the verb and, to determine if the LUWID needs to be sent to a partner node at this time for updating. The latter depends on whether the partner node has been left out in the past by the present node and on whether the partner node will be included in the present transaction for the first time by the local node. If an updated LUWID is to be sent to the partner node during this transaction, it is desirable to send it only once in the first message to the node. Step 410 determines if a message is to be sent to the partner node. If so, step 411 determines if this is the first message to the partner node during this transaction. If so, step 412 determines if the variable OK-LO-PARTNER for this partner is set to TRUE. If so, this means the partner has been left out in the immediate past and needs an LUWID update. Thus, step 414 inserts the correct LUWID for this transaction into the message destined for the partner. This insures that when the message is sent as part of the present verb execution (step 416), the partner node will begin operations with the correct logical unit of work identifier, even if it has been left out of several consecutive transactions. The present verb is executed at step 416. This process thereafter repeats with control being returned to the TP at step 404 to await for the issuance of a new verb.

Eventually, at step 408 in some node of the tree, a sync point verb will be received by the SPM of that node. For purposes of discussion, assume that this sync point operation is considered to be for transaction x. This means that this transaction is complete as determined by the node initiating sync point and it is time to either commit or backout the transaction. The function of the SPM receiving a sync point command from its TP is to initiate 'prepare to commit' messages to each of its children that are not to be left out of this sync point operation in accordance with the invention. A 'prepare to commit' is then sent by those nodes to all of their children that are not left out of this sync point operation. Step 408 initiates sync point actions in the sync point root node in response to a sync point verb from the corresponding TP. In this sync point initiator node, transfer is made to P1 (FIG. 5) to begin phase 1, the transmission of 'prepare to commit' messages to the children of the sync point initiator that are not to be left out. The goal of this first phase is to determine which children of the present node should be left out and to omit the 'prepare-to-commit' or 'back out' messages to these children. This, in turn, depends on the state of the OK-LO-PARTNER variable for each node from the last sync point operation x−1.

As an aside, each node receiving a 'prepare to commit' message invokes code (not shown) that causes the TP at that node to also issue a sync point operation at step 406 of that node.

Figure 5:
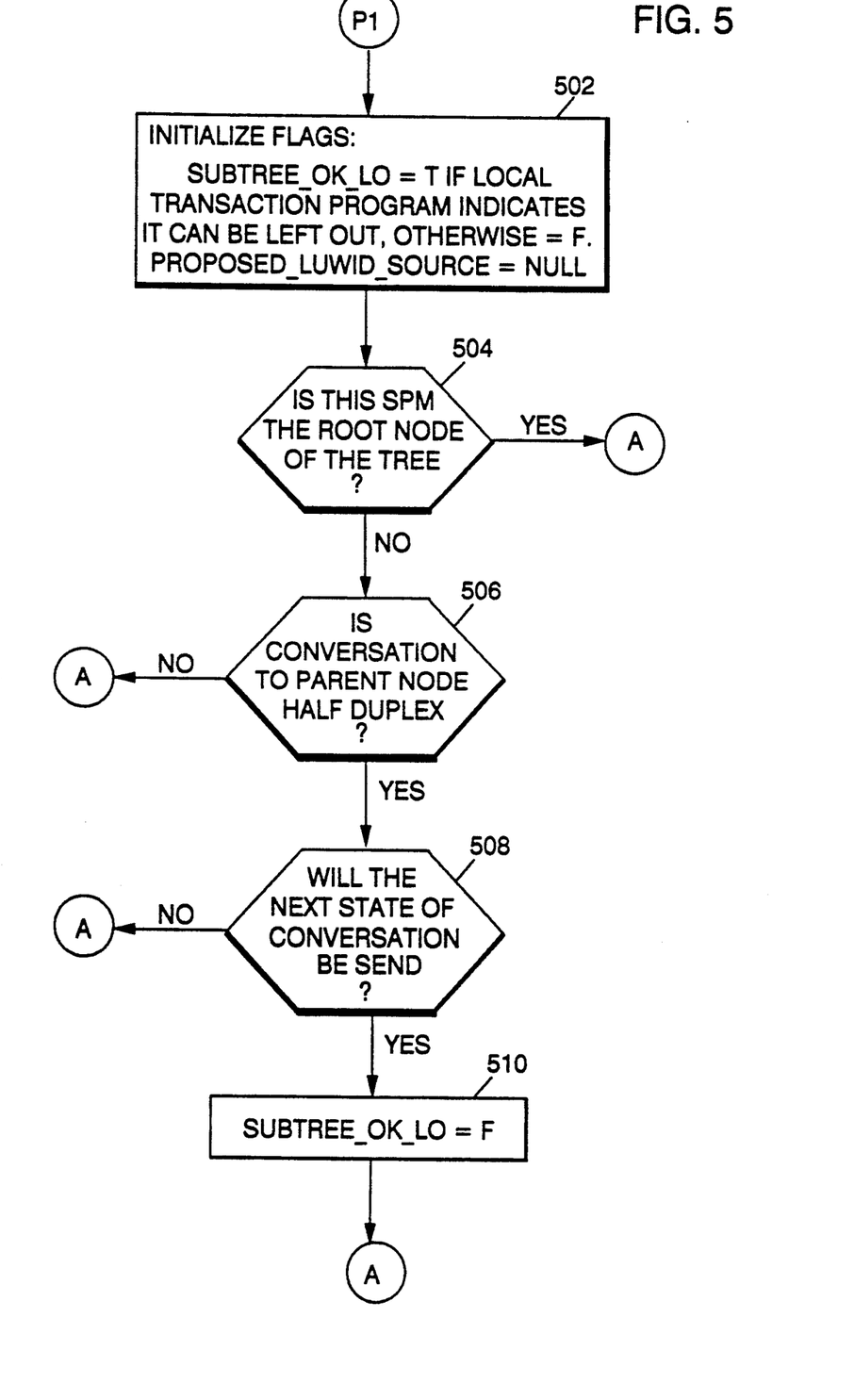

Step 502 at the beginning of the first phase of the sync point protocol starts by initializing the state of the SUB-TREE-OK-LO variable to the leave out state indicated by the local TP. The state of this variable is used eventually to inform the parent node, if any, of the present node if the sub-tree it heads can be left out of the next sync point operation. This state may changed as program continues. For now, it merely reflects the subsequent leave out status of this node from the TPs point of view. A TP might decide that it can be left out, for example, if it were a server that would do nothing unless asked by another node. LU6.2 provides a specific verb (SET-SYNC-POINT-OPTIONS) that can be used by a TP to provide such leave out information to the SPM. Obviously, any other desired means of communication could be used in other systems. Step 502 also initializes the state of the PROPOSED-LUWID-SOURCE variable to 'null'. Step 504 determines if this node is the sync point initiator. If it is, this node has no parent node and cannot be left out by such a parent. In this case, program execution proceeds immediately to step 602. If this node is not the sync point initiator, then whether or not it is OK to tell the parent node on a subsequent 'agree' message that it may be left out of the next sync point operation depends in part on whether the conversation to the parent is half duplex and if so, whether the state of the conversation to the parent node at the end of this sync point operation will be 'receive'.

A node cannot be left out by a partner node unless the state of the connection allows the partner to send the next message. If not this node could then be left out forever. Therefore, step 506 determines if the conversation to the parent node half duplex. If it is, step 508 determines if the next state of the conversation to the parent will be a 'send' state. If the conversation to the parent is full duplex (step 506) or if the next state of the half duplex conversation will be 'receive', it is OK, at least so far, to tell the parent that it is OK to leave out this child node. Therefore, program execution proceeds via exit A to step 602. Otherwise, step 510 sets SUB-TREE-OK-LO to FALSE. When an 'agree' message is eventually returned to the parent as a response to this sync point operation, the state of the OK-LO flag will be set to FALSE, as will be seen.

Figure 6:
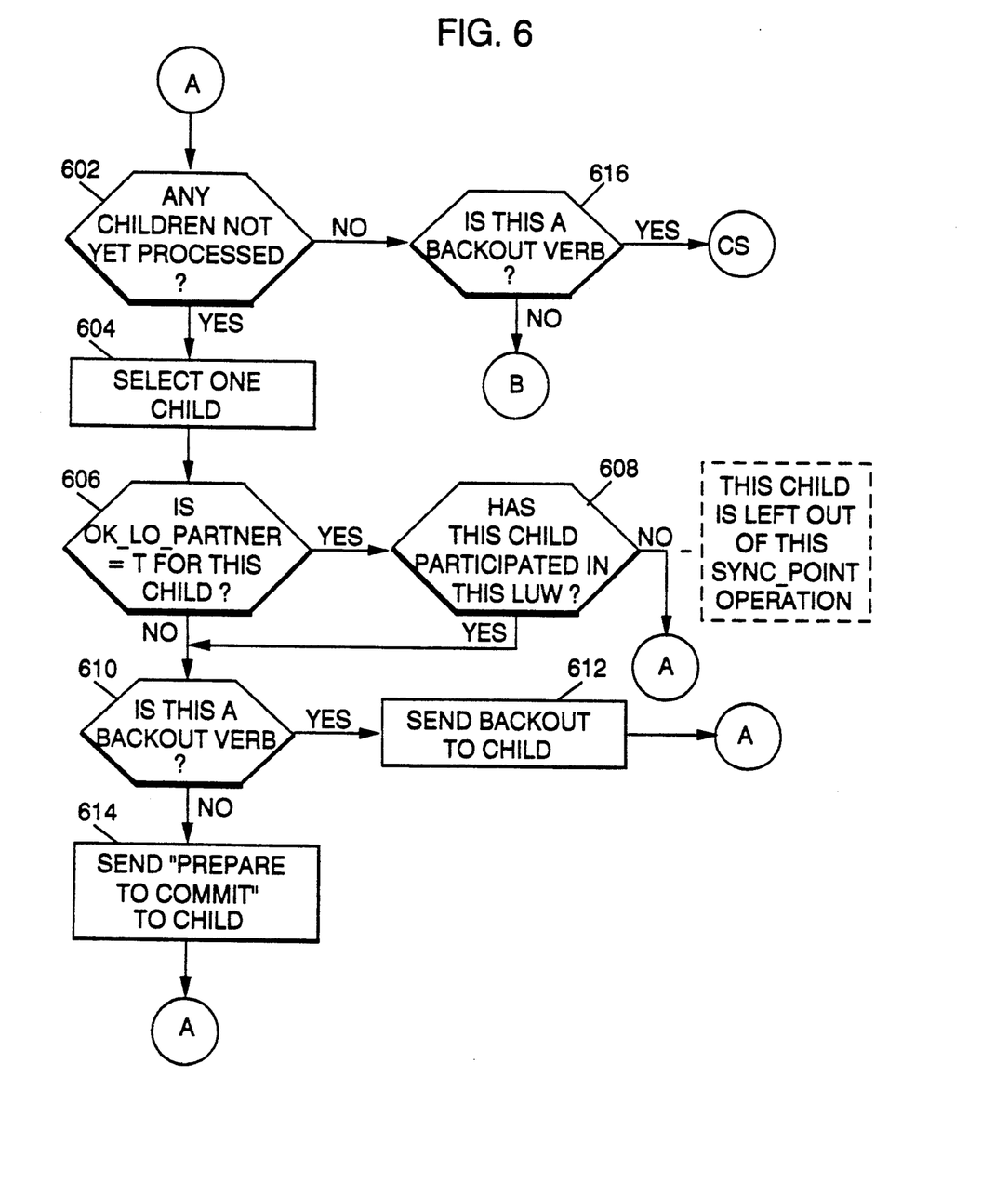

The steps of FIG. 6 represent a loop in which a 'backout' or 'prepare to commit' message is sent to each child node of the present node. In accordance with the invention, no sync point messages will be sent to children that can be left out. Step 602 determines if there are any more child nodes to process in the loop. If the answer is yes, step 604 picks one of the remaining children. Step 606 interrogates the present state of the variable OK-LO-PARTNER for this child. Remember that the state of this variable reflects the state that was set during the last successful sync point. If the state is TRUE and the present node has not communicated with the child during the present transaction, then it is okay to leave this child out of the present sync point operation. Step 608 determines if the present node has communicated with the child during this transaction. If it has not, then the child is now left out of this sync point operation by proceeding directly to program address A and thereby not sending a sync point message to the child. If OK-LO-PARTNER is set to FALSE (step 606) or the present node has communicated with the child during the present transaction x (step 608), then step 614 sends a 'prepare to commit' message to the child (assuming that step 610 determines that this sync point operation is not a backout). Otherwise, if the verb being executed is BACKOUT, step 612 sends a 'backout' message to the child.

Figure 7:
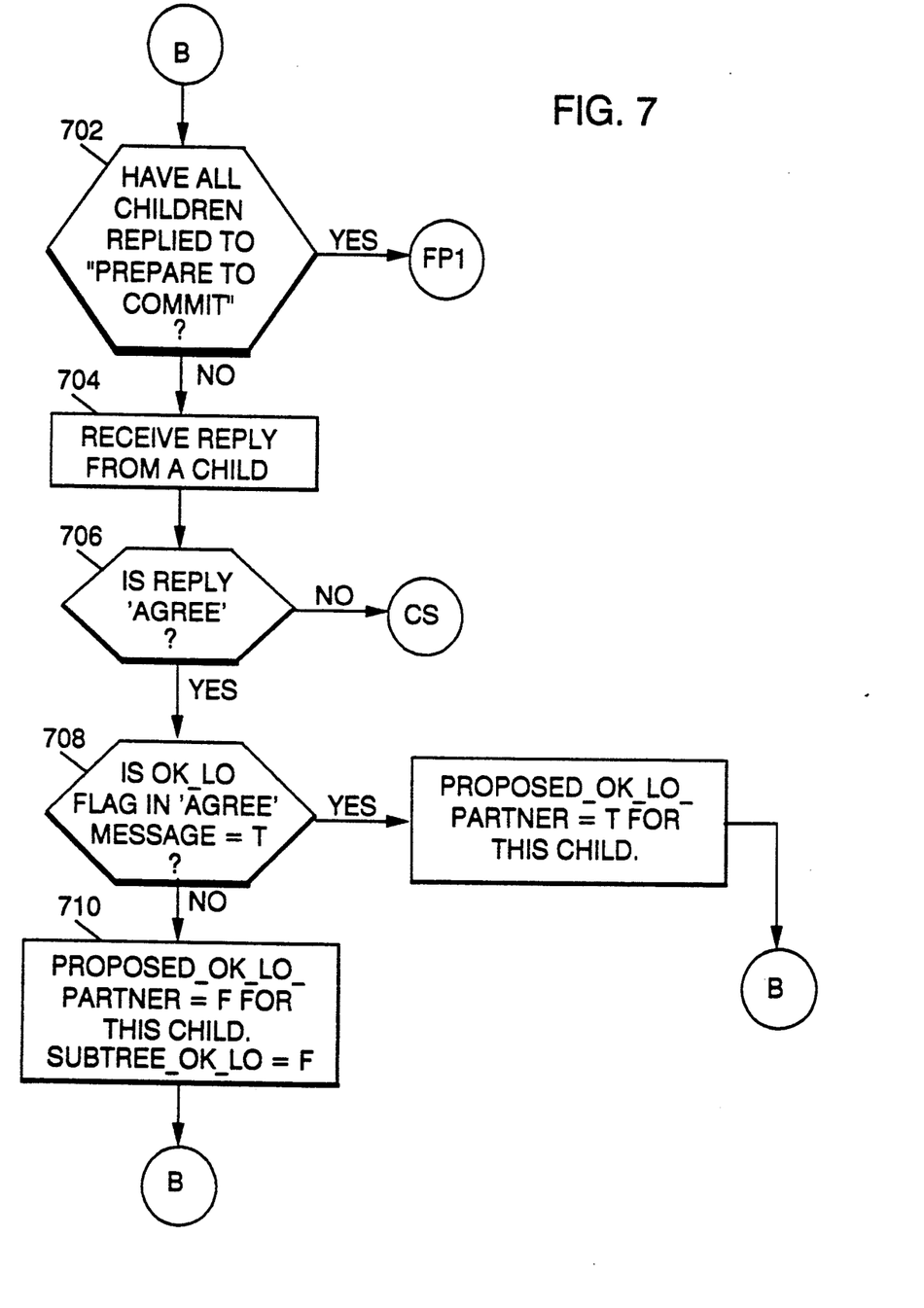

When step 602 determines that all children of the present node have been processed, step 616 checks again if the verb being executed is a BACKOUT. If not, the program must wait for and collect responses to the 'prepare to commit' messages sent at step 614. This is required to determine if all of the children agree to the commit and to collect the states of the OK-LO flag for transaction x+1 in each of the responses from the children. A loop to perform this process begins at step 702. On the other hand, if the verb is BACKOUT at step 616, this present node will not change the leave out status of any of its children during this sync point operation. In this case it is sufficient to go directly to FIG. 12 to complete the present sync point operation. Assuming that the present operation is COMMIT, step 702 sets up a loop to receive a response from each child that was sent a 'prepare to commit' message. Step 704 indicates that a response from one child has just been received. Step 706 determines if the response is an 'agree' message to the 'prepare to commit'. If the response from any child of the present node is 'don't agree', then the transaction is be backed out at all nodes; there is no need to wait for the remaining responses from all children; the loop is broken and program control is transferred to address CS in FIG. 12 to complete the backout. If the response from any given child is 'agree', step 708 interrogates the OK-LO flag in the 'agree' message. If the flag is TRUE, this means that the child and all of its children have also agreed that their subtree can be left out of the next sync point operation $x+1$. In this event, step 708 sets the PROPOSED-OK-LO-PARTNER variable to TRUE for this child and returns to await the next response, if any, from a child to the earlier 'prepare to commit' message. If the OK-LO flag is FALSE in the message from the child at step 708, step 710 sets the PROPOSED-OK-LO-PARTNER variable for this child to FALSE. This state takes effect only if the operation commits. If the state is FALSE, the present node will include this child in the next sync point operation. Of course, the child may have its own child or children that it may have determined can be left out.

Figure 8:
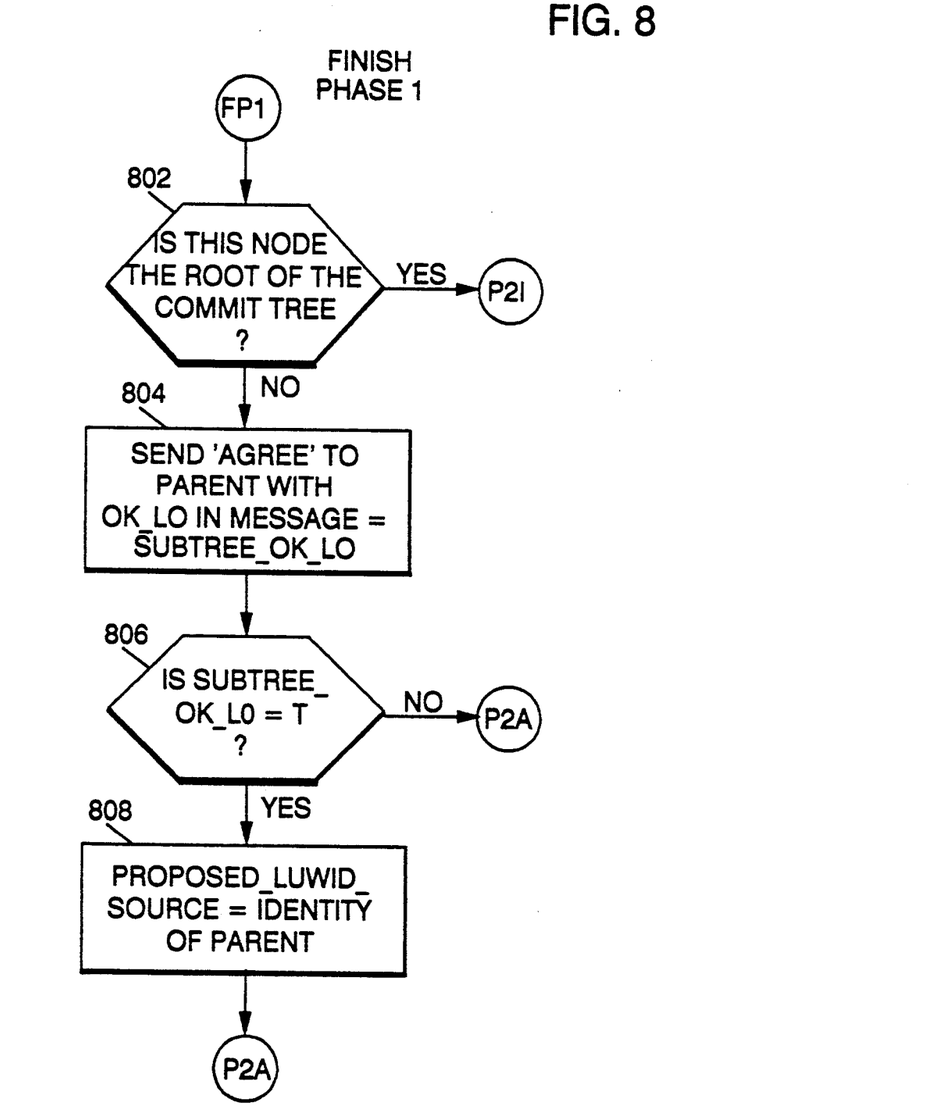

If all children agree to the 'prepare-to-commit' when the loop finishes at step 702, control is transferred to address FP1 in FIG. 8. The purpose of FP1 is to finish phase 1 of the two-phase protocol. This means generating the response to parent node of this node, if there is a parent node, for the 'prepare to commit' received by the present node from the parent. Step 802 determines if this node is the root node of the sync point tree. If it is, there is no parent to which a response should be returned. In this case, control is transferred to address P2I in FIG. 10 to begin the second phase. If this node is not the root of the commit tree, step 804 sends an 'agree' message to the commit parent with the OK-LO flag set to the state of the SUBTREE-OK-LO variable. Remember that the SUBTREE-OK-LO variable was set by step 502 to TRUE if the local TP previously indicated that it could be left out, and may have subsequently been reset to FALSE if a half duplex connection to the parent could permanently lock out this node (step 510) or if a child voted not okay to leave out in an 'agree' message (step 710). If the resulting state of the OK-LO flag in the response to the parent of the present node is TRUE, the subtree formed by this node and its children will be excluded (left out) of protocol exchanges on the next and subsequent sync point operations, until some event, like a request for services from the parent node, reinstates the subtree. Step 806 next determines the state of the SUBTREE-OK-LO variable that was just included in the 'agree' to this node's parent. If the state is TRUE, then step 808 sets the variable PROPOSED-LUWID-SOURCE to the identity of the parent. This value will take effect only if the operation commits. If this value is TRUE, this node may be left out of the next transaction by the parent, and will eventually require a LUWID update from the parent before it resumes processing. The value of PROPOSED-LUWID-SOURCE identifies the parent as the future source of the LUWID.

Figure 9:
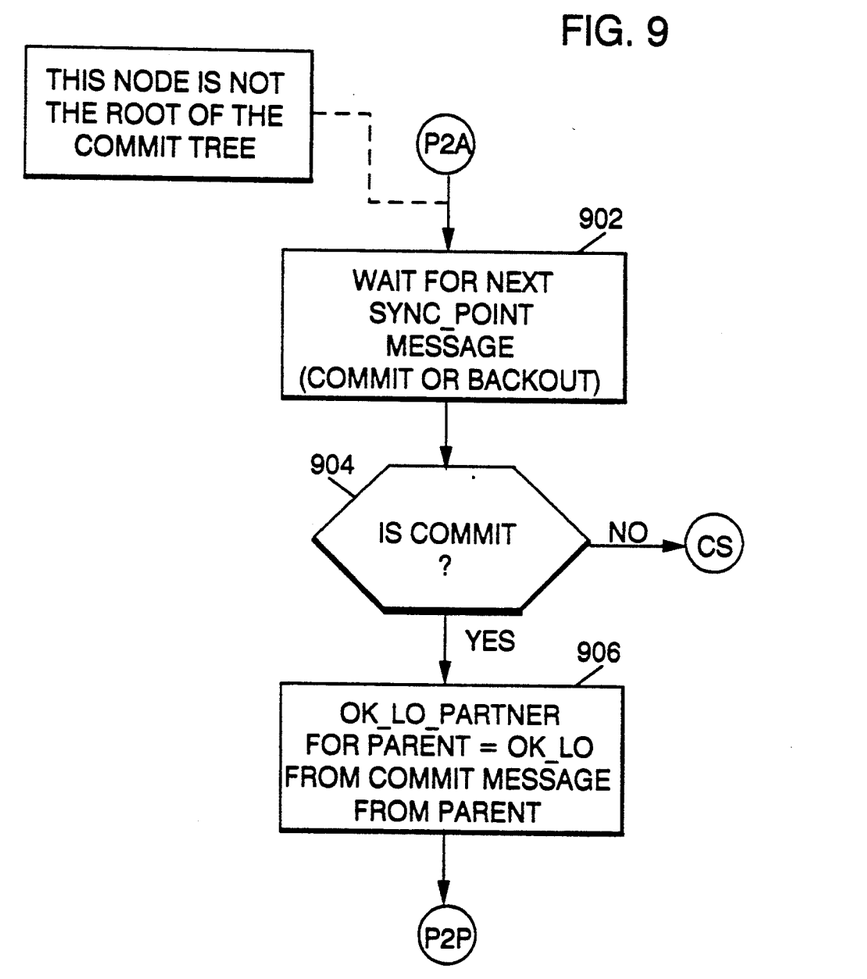
Figure 10:
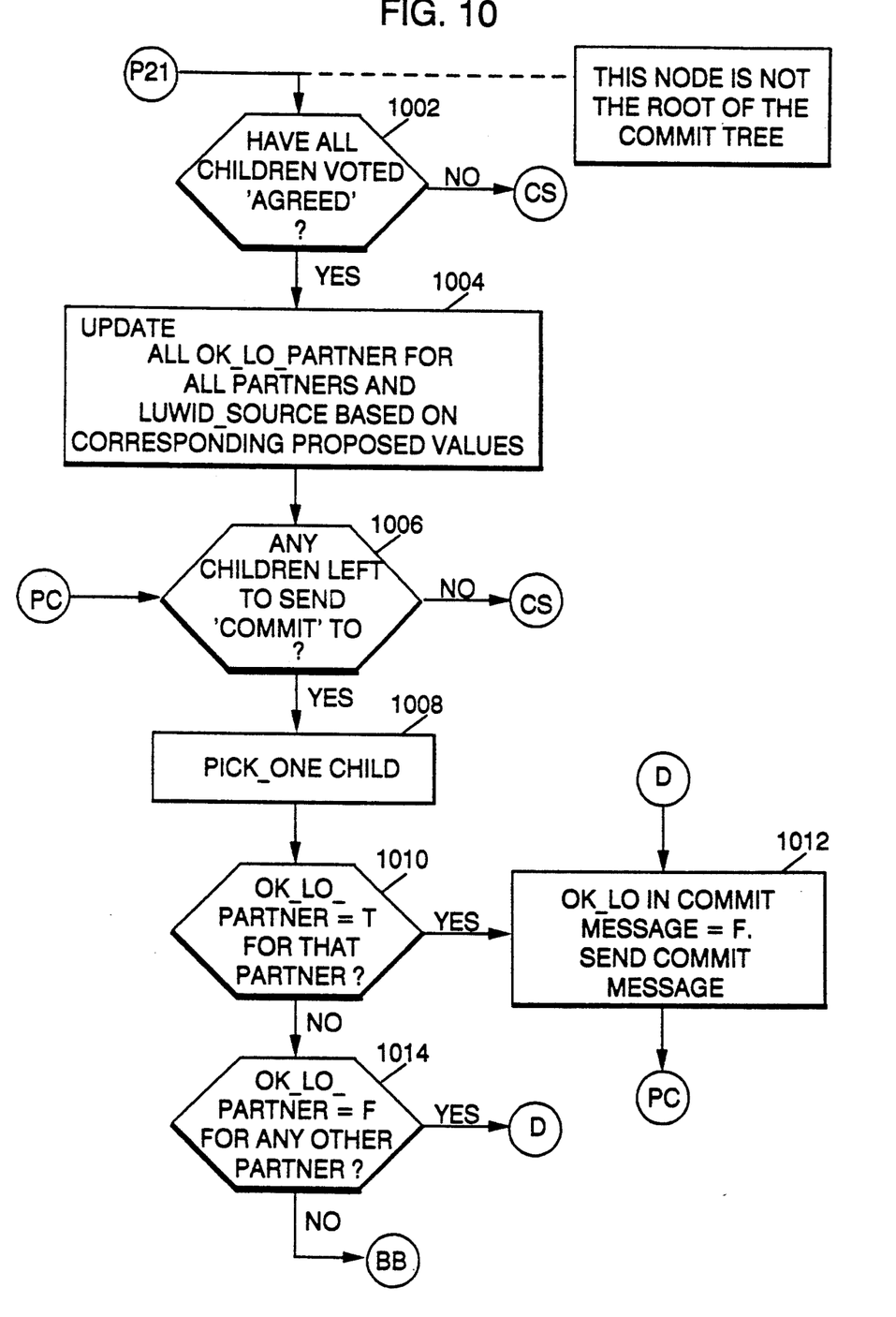

Program execution next proceeds with phase 2 of the protocol at address P2A in FIG. 9.

Step 902 waits for the next message from the parent, which should be either a commit or backout as part of phase two. If the message is a backout at step 904, the present transaction will be backed out and control is transferred to CS in FIG. 12 to perform this. If the response at 904 is a commit, step 906 sets the OK-LO-PARTNER variable for the parent to the state of the OK-LO flag in the commit message from the parent. If this value is TRUE and the present node becomes the parent of the present parent for the next sync point operation $x+1$, then that node (the present parent) and its subtree may be left out of sync point operation $x+1$. Certain criteria must be met for this to happen as described in steps 1010, 1014, 1102 and 1104. After step 906, program execution proceeds with the remainder of phase 2 at address P2P in FIG. 10.

Figure 11:
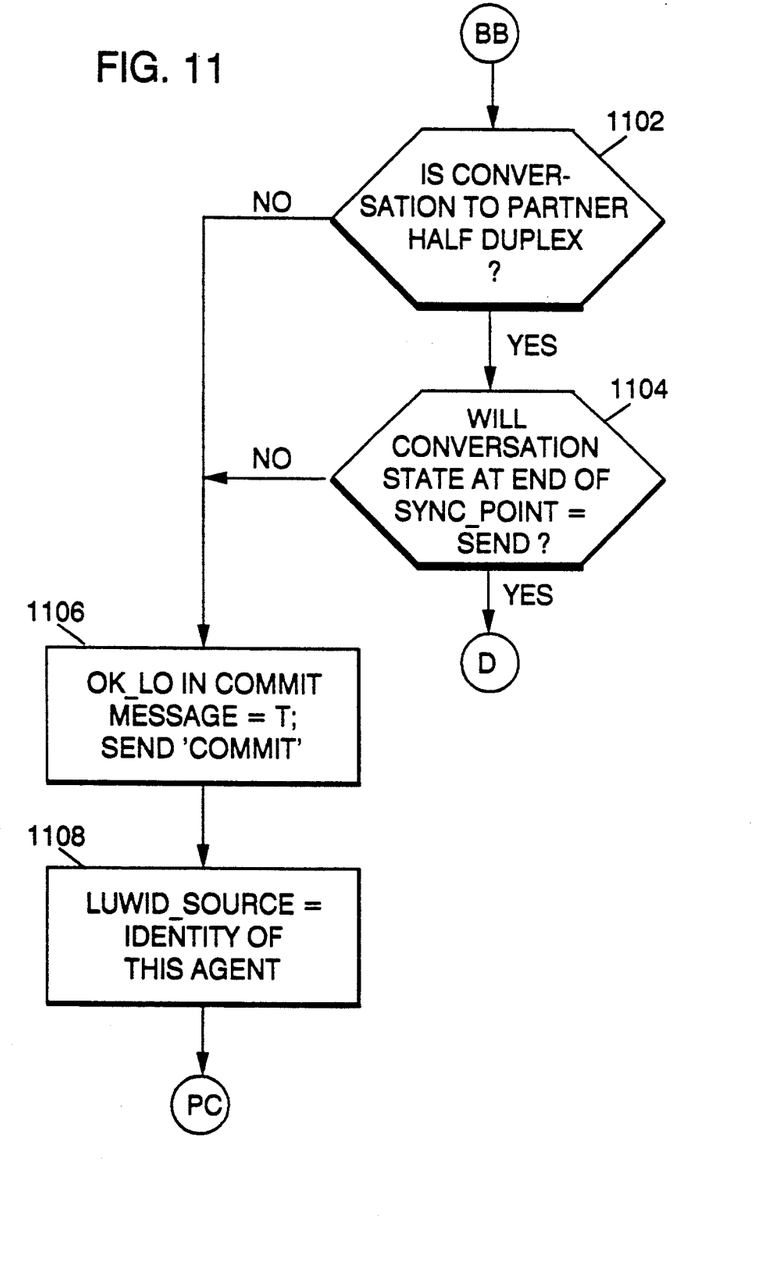

Remember that program execution makes its way from FP1 to P2P (FIG. 10) only if this node is not the root of the commit tree (step 802). If this node is the commit root, transfer is made directly from 802 to P2I in FIG. 10. The commit root node must collect all the responses to 'prepare to commit' and decide if the present transaction is to be committed or backed out. On entry to P2I, step 1002 in the root node determines if all of its children have voted 'agree' to the 'prepare to commit'. If the answer is no, the transaction will be backed out. Transfer is made to CS in FIG. 12 to perform the backout. On the other hand, if all children 'agreed' (which means all nodes that received 'prepare to commit'), step 1004 (which is also the entry from P2P when this node is not the commit root) updates the variable OK-LO-PARTNER for each of its partners by setting the variable to the state of the corresponding variable PROPOSED-OK-LO-PARTNER. Step 1004 also updates the value of LUWID SOURCE to the value of PROPOSED-LUWID-SOURCE. Step 1006 sets up a loop to control the transmission of 'commit' messages to all children of this node. The problem here is to determine the state of the OK-LO flag to be included in these 'commit' messages. The state of this flag reflects whether the child node receiving the message can leave out this sending node on a subsequent sync point transaction. The state of the OK-LO flag that is included in the present 'commit' message to each child depends on the state of the OK-LO-PARTNER variable for the child and on the state of the OK-LO flag given to other children. With respect to the first consideration, if a child's variable OK-LO-PARTNER is set to TRUE, the present node can subsequently leave out the child. In this case, the present node cannot also tell the child that it can leave out the present node in the next sync point. That might produce a permanent lockout between the two nodes. With respect to the latter consideration, the present node cannot also be excluded on the next sync point unless all of the nodes on the parent side of the network have stated that they can also be left out of the next sync point operation. For example, with reference to FIG. 3, if it is assumed that node 300-4 is the present sync point initiator, then in order to set OK-LO in the 'commit' to node 300-6, all other descendents of 300-4, i.e., 300-1,2,3 and 5 must have said that it is okay to leave them out in the previous 'agree' message. The above problems are solved as follows. Step 1008 picks the first or next child. Step 1010 determines if OK-LO-PARTNER is set to TRUE for this child. If it is, then step 1012 sends a 'commit' message to the child with the OK-LO variable set to FALSE. This guards against the first consideration above. If OK-LO-PARTNER is FALSE for the child at step 1010, then step 1014 determines if variable OK-LO-PARTNER is FALSE for any other partner of this node. If this is true, step 1012 is executed to set the OK-LO flag in this 'commit' to the child to FALSE and the child loop continues at step 1006. Otherwise, step 1102 at program address BB in FIG. 11 is executed. FIG. 11 contains steps 1102 through 1108 that perform the same tests as earlier mentioned with respect to steps 506 and 508 for testing the end state of a connection if it is half duplex. These tests insure that the partner that leaves out a local node can send it the next message.

Figure 12:
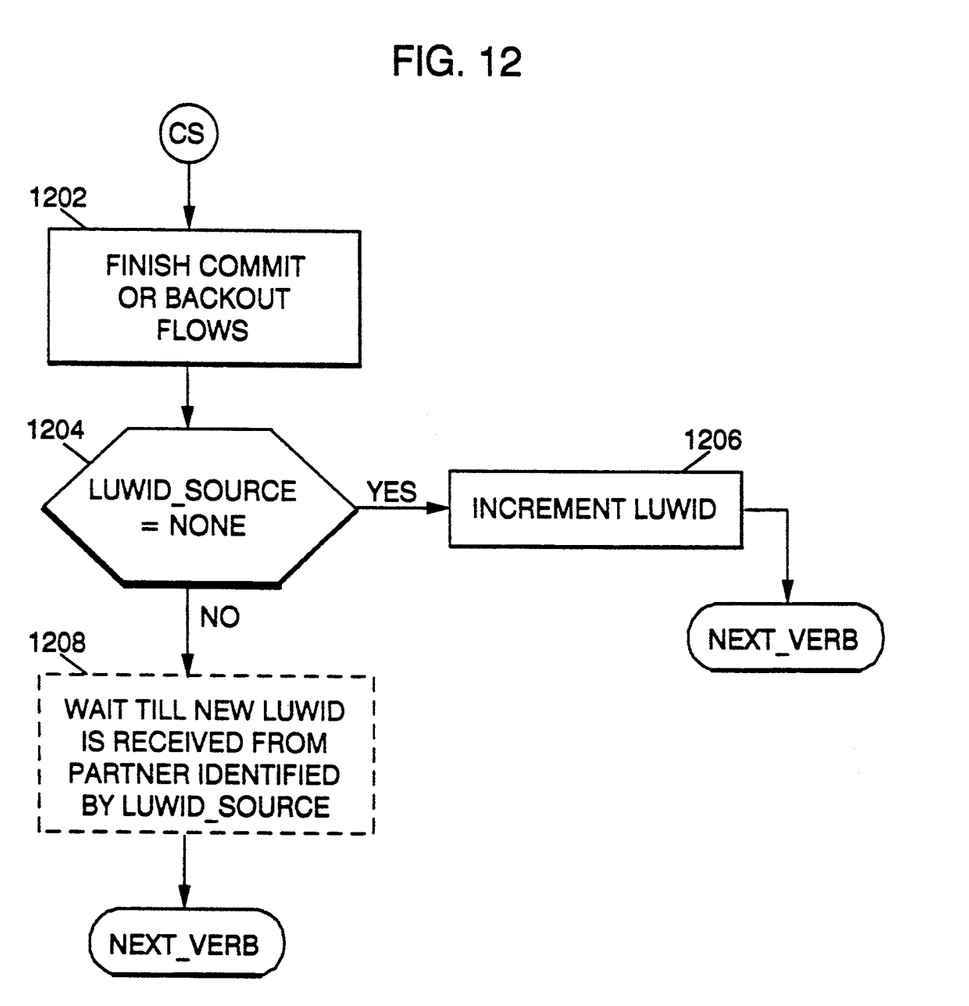

As mentioned at several places above, CS in FIG. 12 is entered to complete sync point operations. These operations are conventional and do not form part of the invention. The flow is included here for completeness. Step 1202 merely states to finish the present 'commit' or 'backout' message flows to appropriate partner nodes of the present node. Following this, the sync point operation is complete. Step 1204 interrogates the state of variable LUWID-SOURCE. If the state is 'null', this node has not told any partner that it can be left out. It is not expecting a LUWID update from some node that has left it out, because its LUWID is up to date. In this event, the node merely increments its LUWID to form the new LUWID for the next transaction and returns to NEXT VERB in FIG. 4 to await the first verb of the new transaction. Otherwise, step 1208 waits indefinitely until a new LUWID is received from the node identified by LUWID-SOURCE before beginning new work.

It is to be understood that the above described arrangements are merely illustrative of the application of principles of the invention and that other arrangements may be devised by workers skilled in the art without departing from the spirit and scope of the invention.

We claim:

1. In a distributed transaction network having a plurality of nodes forming a logical tree and using a two-phase sync point protocol for determining to commit or backout a transaction in the network, a method of reducing the number of sync point messages in the network to control transaction processing, comprising the steps of in response to the beginning of a sync point operation on the present transaction x, determining at each node if each partner node stated during an earlier transaction that it could be left out of sync point operations for the present transaction x, for each partner node that stated it could be left out, determining if the partner node was included by this node during the present transaction x, and if the partner node was not included during the present transaction x, excluding the partner node from the present sync point operations.

2. The method of claim 1 wherein a sync point operation comprises propagating a prepare to commit message from a sync point initiator node to the remaining nodes of the network, propagating agree or not agree messages to the sync point initiator in response to the prepare to commit message and propagating a commit or backout message from the sync point initiator node to the remaining nodes of the network, wherein the step of excluding further comprises propagating the prepare to commit message to nodes that stated during a previous sync point operation that they could not be left out of sync point operations for transaction x.

3. The method of claim 2 wherein the step of excluding further comprises propagating the prepare to commit message to nodes that were included in transaction x.

4. The method of claim 3 wherein the step of excluding further comprises omitting the propagation of prepare to commit messages to all other nodes.

5. The method of claim 2 or claim 3 or claim 4 further comprising the step of determining if a partner node that is a child node in the present sync point operation has stated that it can be left out of sync point operations for the next transaction by interrogating a first indication in an agree message from the child node, the state of the first indication indicating whether or not the child node can be left out of the next sync point operation from that child node's point of view.

6. The method of claim 5 further comprising the step of determining if a partner node that is a parent node in the present sync point operation has stated that it can be left out of sync point operations for the next transaction by interrogating a second indication in a commit message from the parent node, the state of the second indication indicating whether or not the parent node can be left out from that parent node's point of view.

7. The method of claim 2 further comprising the following steps performed at each node that is not the sync point initiator, propagating a prepare to commit message to each of its children nodes in response to receipt of a prepare to commit message from its parent node, waiting for a response agree or not agree message from the children nodes in response to the prepare to commit message, setting a first indication to an okay to leave out state in an agree message to the parent node if all children indicated in their responses that they can be left out and the present node agrees that it can also be left out.

8. The method of claim 7 wherein the setting of the first indication in an agree message further comprises determining if the connection to the parent node is a half duplex connection, if the connection is a half duplex connection, determining if the state of the connection at the end of the sync point operation will be a receive state from the parent, and if so, setting the first indication in the agree message to the parent to the okay to leave out state, and otherwise, setting the first indication to the parent to the not okay to leave out state.

9. The method of claim 7 further comprising the following steps performed at each node that is not the sync point initiator, in response to a commit message from a parent node, for each child node, determining if all the other partner nodes, including the parent node, have agreed that they can be left out of the next sync point operation, if so, determining if the child node has indicated that it cannot be left out of the next sync point operation, if so, setting the second indication to the okay to leave out state in a commit message to the child node.

10. The method of claim 9 further comprising determining if the connection to the child is a half duplex connection, if the connection is a half duplex connection, determining if the state of the connection at the end of this sync point operation will be a receive state from the child, and if so, setting the second indication in the commit message to the child to the okay to leave out state, and otherwise, setting the second indication to the child to the not okay to leave out state.

11. The method of claim 1 further comprising the following steps performed at the sync point initiator,
- propagating a prepare to commit message to each of its children nodes that has not indicated that it okay to be left out or that has participated in the present transaction,
- waiting for a response message to the prepare to commit message from each of the children nodes,
- determining if all responses to the prepare to commit message are agree,
- if so, for each child, determining if the child has indicated that it cannot be left out of the next sync point operation,
- if so, determining if all other children nodes have indicated that they can be left out,
- if so, setting the second indication in a commit message to the child node to the okay to leave out state.

12. The method of claim 11 wherein setting the second indication in a commit message further comprises
- determining if the connection to the child is a half duplex connection,
- if the connection is a half duplex connection, determining if the state of the connection at the end of this sync point operation will be a receive state from the child,
- if so, setting the second indication in the commit message to the child to the okay to leave out state, and
- otherwise, setting the second indication to the child to the not okay to leave out state.

13. In a distributed transaction network having a plurality of nodes logically configured into a tree for each database transaction, a method of reducing the number of protocol messages that flow in the network to control transaction processing, comprising the steps of
- at each node that performs work for transaction x,
- determining if the node will perform work at its own initiative on transaction x+1,
- if the node will not perform work at its own initiative on transaction x+1, informing its parent node during transaction x that it may be excluded during processing of transaction x+1, and
- at each node performing work during transaction x+1,
- determining if a child node previously indicated that it may be excluded during this transaction, and, if so,
- transmitting protocol messages to the child node only if this node has need of the transaction services of the child node.

14. For use in a distributed transaction network having a plurality of nodes forming a logical tree and using a two phase sync point protocol for determining to commit or backout a transaction in the network, apparatus at each node for reducing the number of sync point messages in the network to control transaction processing, comprising
- first means responsive to a first signal from each partner node on a sync point operation pertaining to a past transaction for determining if it is okay to leave the partner out of sync point operations for a present transaction,
- second means for determining if the partner node has been included by this node in the present transaction, and
- means responsive to a first state of the first signal and to the determining means for excluding the partner node from the present sync point operations if the partner node was not included during the present transaction.

15. The apparatus of claim 14 wherein a sync point operation comprises propagating a prepare to commit message from a sync point initiator node to the remaining nodes of the network, propagating agree or not agree messages to the sync point initiator in response to the prepare to commit message and propagating a commit or backout message from the sync point initiator node to the remaining nodes of the network, wherein the excluding means further comprises
- means responsive to a second state of the first signal from a node for propagating the prepare to commit message to the node.

16. The apparatus of claim 15 wherein the excluding means further comprises
- means responsive to the second determining means for propagating the prepare to commit message to the node if it participated in the present transaction.

17. The apparatus of claim 16 wherein the excluding means further comprises
- means responsive to the first state of the first signal and to the second determining means for omitting the propagation of the prepare to commit message to the node.

18. The apparatus of claim 14 further comprising
- means at each node for determining that the node is not the sync point initiator,
- means for propagating a prepare to commit message to each of its children nodes in response to receipt of a prepare to commit message from its parent node,
- means for waiting for a response message from each of the children nodes to the prepare to commit message,
- means for setting the first signal to the first state in an agree message to the parent node if the first indication in all responses from the children are set to the first state and the present node agrees that it can be left out of the next sync point operation.

19. The apparatus of claim 18 further comprising
- third means for determining if the connection to the parent node is a half duplex connection,
- fourth means for determining that the state of the half duplex connection at the end of this sync point operation will be in a receive state from the parent; and
- means responsive to the fourth means for setting the first signal in the agree message to the parent to the first state.

20. The apparatus of claim 18 further comprising
- third means responsive to a commit message from a parent node for determining for each child node if all the first signals from all other partner nodes, including the parent node, is set to the first state,
- fourth means responsive to the third determining means for determining if the first signal from the child node is set to the second state,
- means responsive to the fourth determining means for setting the second signal to the first state in a commit message to the child node.

21. The apparatus of claim 20 further comprising
- fifth means for determining if the connection to the child is a half duplex connection,
- sixth means responsive to the last mentioned means for determining if the state of the connection at the end of this sync point operation will be a receive state from the child, and means responsive to the sixth determining means for setting the second signal in the commit message to the child to the first state.

22. The apparatus of claim 14 further comprising third means for determining if a node is the sync point initiator, means responsive to the third determining means for propagating a prepare to commit message to each of its children nodes for which the first signal is set to the second state, fourth means for determining if all responses to the prepare to commit message are agree, fifth means responsive to the fourth determining means for determining for each child if the first signal is set to the second state, sixth means responsive to the fifth determining means for determining if the first signal from all other children nodes is set to the first state, and means responsive to the sixth determining means for setting the second signal in a commit message to the child node to the first state.

23. The apparatus of claim 22 further comprising seventh means for determining if the connection to the child is a half duplex connection, eighth means responsive to the seventh determining means for determining if the state of the connection at the end of this sync point operation will be a receive state from the child, means responsive to the eighth determining means for setting the second signal in the commit message to the child to the first state, and means for otherwise setting the second signal to the child to the second state.

* * * * *